(12) United States Patent
Pyeon et al.

(10) Patent No.: US 11,888,355 B2
(45) Date of Patent: Jan. 30, 2024

(54) ROTOR AND MOTOR INCLUDING SAME

(71) Applicant: LG INNOTEK CO., LTD., Seoul (KR)

(72) Inventors: Jin Su Pyeon, Seoul (KR); Seong Jin Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 802 days.

(21) Appl. No.: 16/961,364

(22) PCT Filed: Jan. 9, 2019

(86) PCT No.: PCT/KR2019/000002
§ 371 (c)(1),
(2) Date: Jul. 10, 2020

(87) PCT Pub. No.: WO2019/151660
PCT Pub. Date: Aug. 8, 2019

(65) Prior Publication Data
US 2020/0350792 A1    Nov. 5, 2020

(30) Foreign Application Priority Data

Jan. 31, 2018  (KR) .................. 10-2018-0011764

(51) Int. Cl.
*H02K 1/27* (2022.01)
*B62D 5/04* (2006.01)
(Continued)

(52) U.S. Cl.
CPC .......... *H02K 1/278* (2013.01); *B62D 5/0403* (2013.01); *H02K 1/276* (2013.01)

(58) Field of Classification Search
CPC ........ H02K 1/276; H02K 1/278; H02K 29/03; H02K 2213/03; B62D 5/0403
(Continued)

(56) References Cited

U.S. PATENT DOCUMENTS 5,936,322 A * 8/1999 Yamaguchi ............ H02K 21/14
310/156.19
6,858,960 B1 * 2/2005 Muszynski ............ H02K 29/03
310/156.47
(Continued)

FOREIGN PATENT DOCUMENTS

| CN | 104937817 | 9/2015 |
| DE | 102013017632 | 4/2014 |

(Continued)

OTHER PUBLICATIONS

Chinese Office Action dated Jan. 13, 2022 issued in Application No. 201980010730.0.
(Continued)

*Primary Examiner* — Alex W Mok
(74) *Attorney, Agent, or Firm* — KED & Associates LLP

(57) ABSTRACT

An embodiment relates to a rotor and a motor comprising same, the rotor comprising: a rotor core; and a plurality of first magnets and second magnets arranged along the outer circumferential surface of the rotor core, wherein each of the second magnets is disposed between the first magnets, and the outer circumferential surface of each of the first magnets has a curvature greater than that of the outer circumferential surface of the second magnet. Therefore, the motor can reduce cogging torque by using the first magnet and the second magnet having different shapes, and thus can improve the quality of the motor.

15 Claims, 14 Drawing Sheets

(51) Int. Cl.
*H02K 1/278* (2022.01)
*H02K 1/276* (2022.01)

(58) Field of Classification Search
USPC .................................................. 310/156.01
See application file for complete search history.

(56) References Cited

U.S. PATENT DOCUMENTS

| | | | | |
|---|---|---|---|---|
| 7,425,785 B2* | 9/2008 | Domeki | ............... | H02K 1/2781 |
| | | | | 310/156.45 |
| 7,965,008 B2* | 6/2011 | Chai | ............... | H02K 1/2781 |
| | | | | 310/156.25 |
| 9,041,268 B2* | 5/2015 | Tomohara | ............... | H02K 1/278 |
| | | | | 310/156.53 |
| 9,595,851 B2* | 3/2017 | Hazeyama | ............ | H02K 1/2766 |
| 2003/0201681 A1* | 10/2003 | Shimizu | ................ | H02K 1/148 |
| | | | | 310/254.1 |
| 2004/0119363 A1* | 6/2004 | Tanaka | ................ | H02K 21/16 |
| | | | | 310/214 |
| 2013/0207508 A1* | 8/2013 | Tomohara | ............ | H02K 1/2766 |
| | | | | 310/216.092 |
| 2013/0307365 A1* | 11/2013 | Sekiya | ............... | H02K 1/276 |
| | | | | 310/156.46 |
| 2014/0117802 A1 | 5/2014 | Sugimoto | | |
| 2015/0357870 A1* | 12/2015 | Hazeyama | ............ | H02K 1/2766 |
| | | | | 310/156.07 |
| 2016/0072371 A1* | 3/2016 | Yamashita | ............ | H02K 15/03 |
| | | | | 29/598 |

FOREIGN PATENT DOCUMENTS

| | | |
|---|---|---|
| DE | 112014000526 | 10/2015 |
| EP | 1895636 | 3/2008 |
| EP | 2254131 | 11/2010 |
| JP | 2005-287173 | 10/2005 |
| JP | 2007-124742 | 5/2007 |
| JP | 2007-174885 | 7/2007 |
| JP | 2013-085407 | 5/2013 |
| JP | 5709907 | 4/2015 |
| JP | 5714189 | 5/2015 |
| JP | 2017-028842 | 2/2017 |
| KR | 10-2017-0133698 | 12/2017 |
| WO | WO 2008/035487 | 3/2008 |
| WO | WO 2018/123839 | 7/2018 |

OTHER PUBLICATIONS

Korean Office Action dated Oct. 14, 2022 issued in Application No. 10-2018-0011764.
Japanese Office Action dated Oct. 25, 2022 issued in Application No. 2020-538786.
European Search Report dated Feb. 25, 2021 issued in Application No. 19747549.4.
International Search Report dated Apr. 16, 2019 issued in Application No. PCT/KR2019/000002.

* cited by examiner

[FIG. 1]
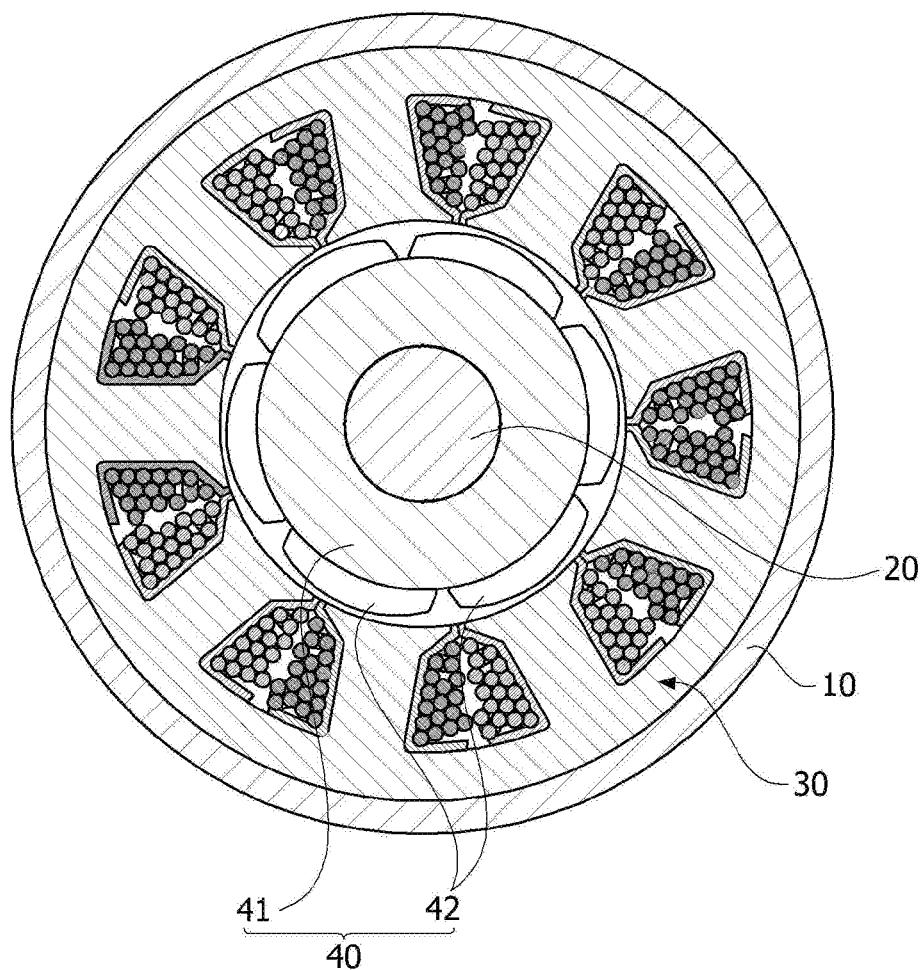

[FIG. 2]
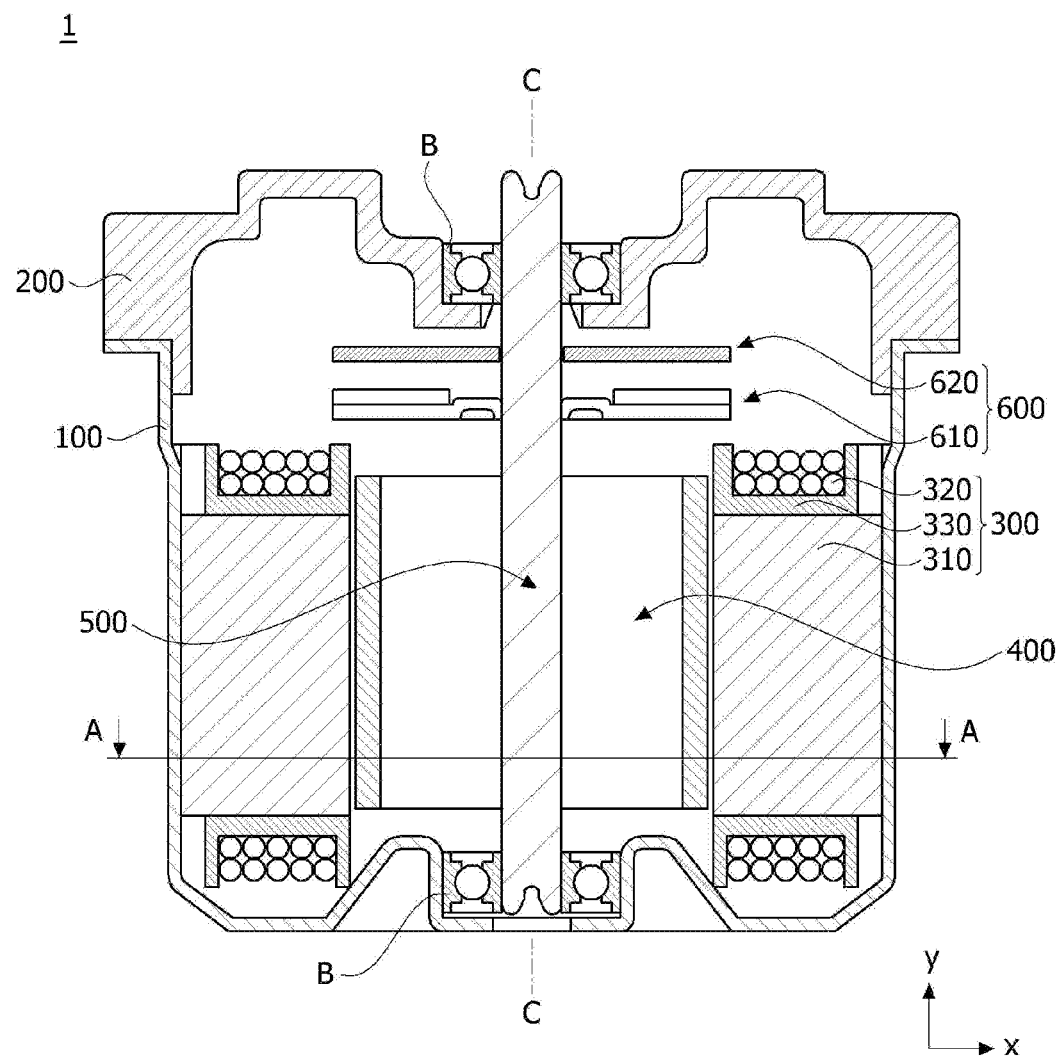

[FIG. 3]
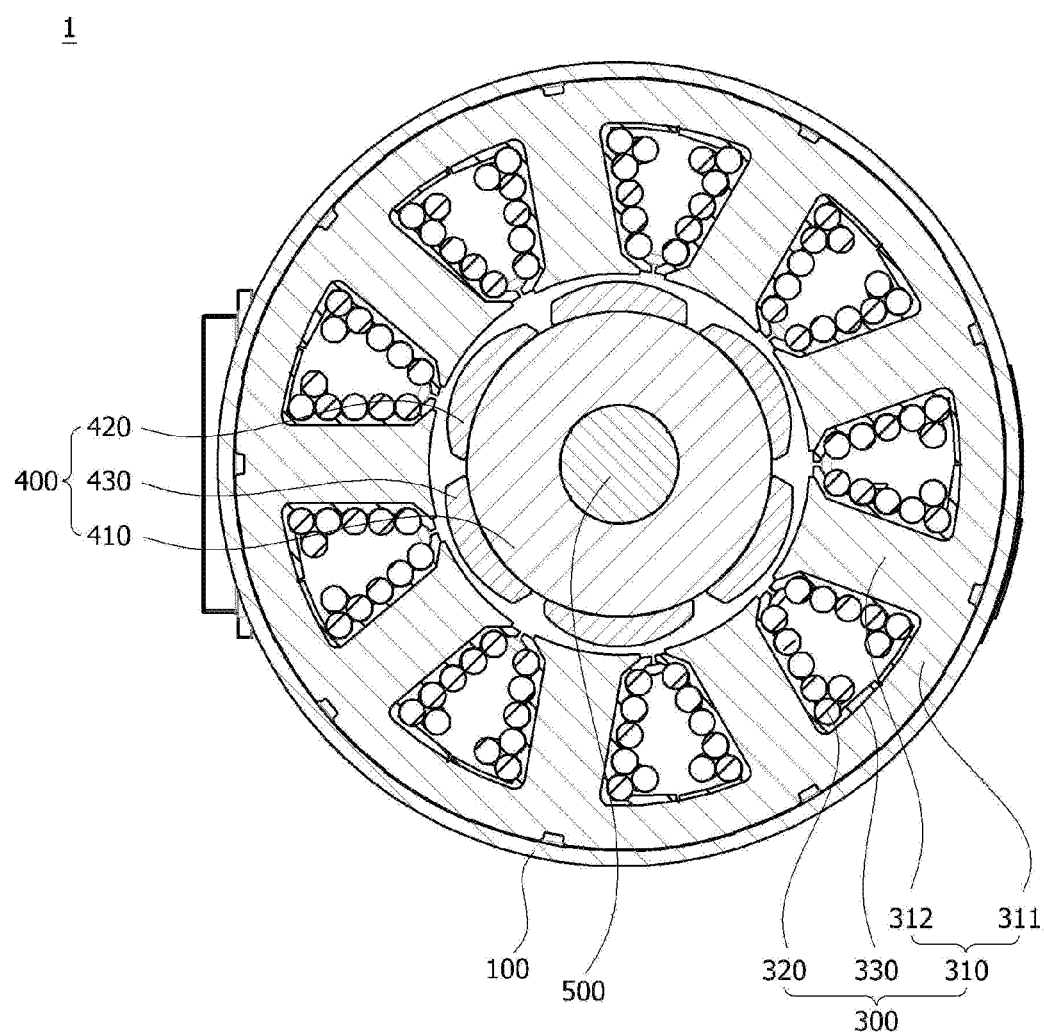

[FIG. 4]
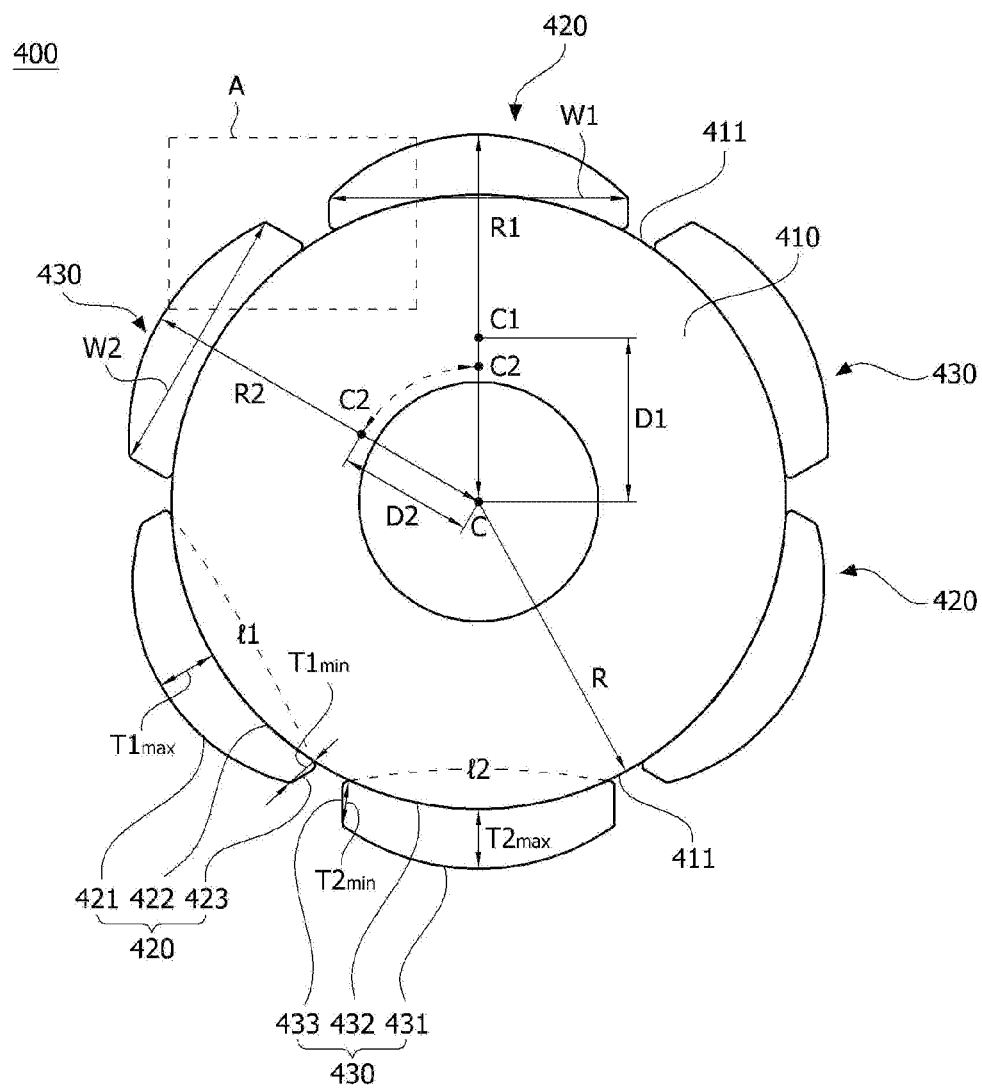

[FIG. 5]
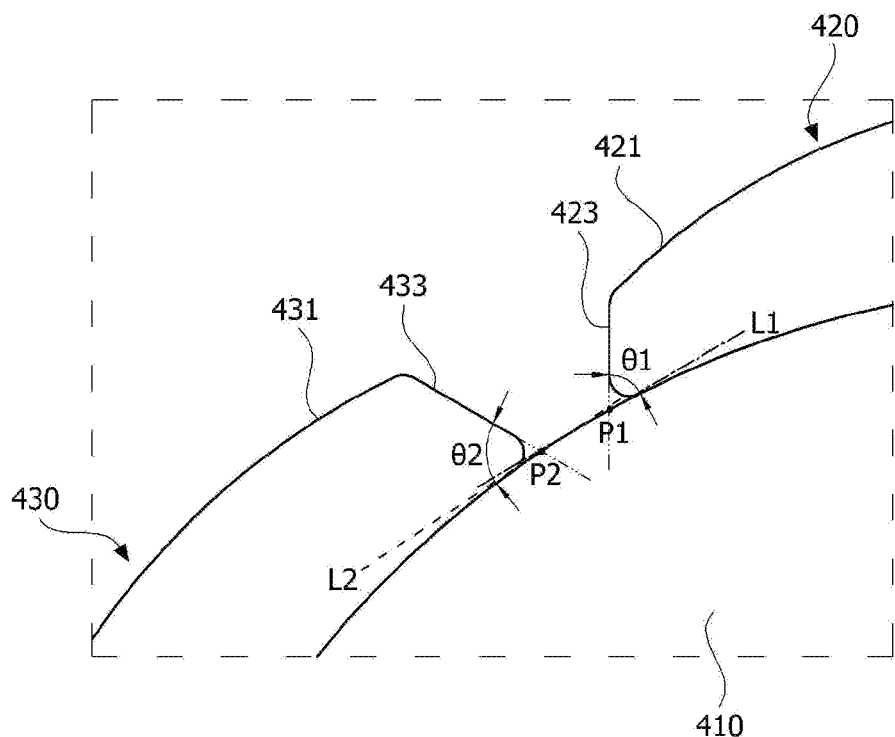
[FIG. 6]
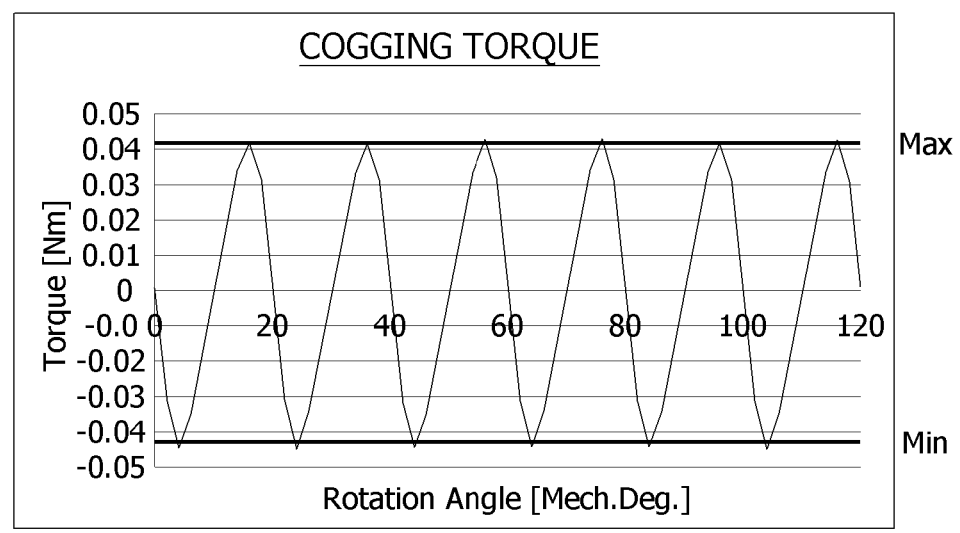

[FIG. 7]
|  | COGGING TORQUE [mNm] | COGGING TORQUE CHANGE RATE | TORQUE [Nm] | TORQUE CHANGE RATE |
|---|---|---|---|---|
| COMPARATIVE MOTOR(2) | 88.00 | - | 4.01 | - |
| R1=11.4mm | 91.6 | 4% ↑ | 3.98 | 0.64% ↓ |
| R1=10.9mm | 104.3 | 19% ↑ | 3.95 | 1.39% ↓ |
| R1=10.4mm | 117.6 | 34% ↑ | 3.93 | 1.89% ↓ |
| R1=9.9mm | 136.5 | 55% ↑ | 3.90 | 2.64% ↓ |
[FIG. 8]
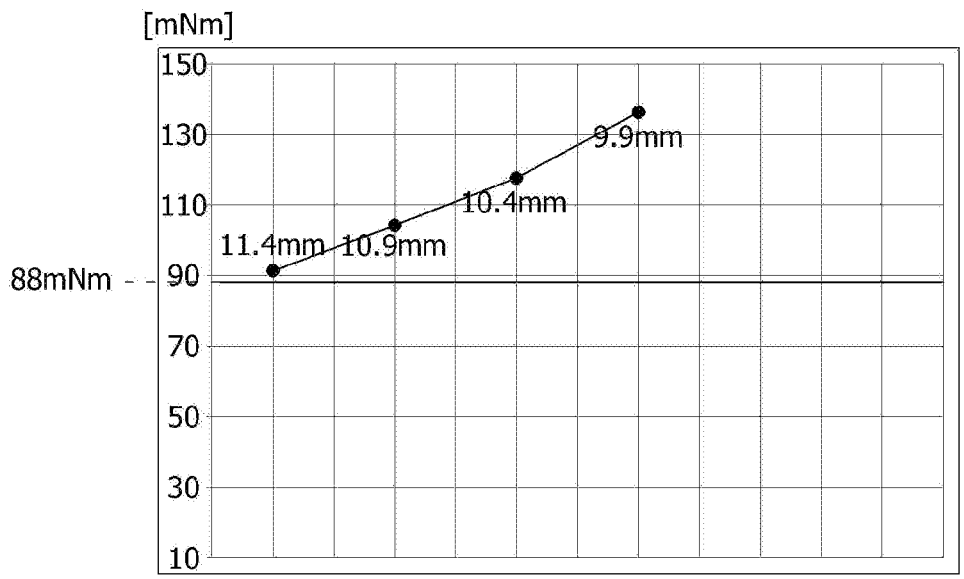

[FIG. 9]
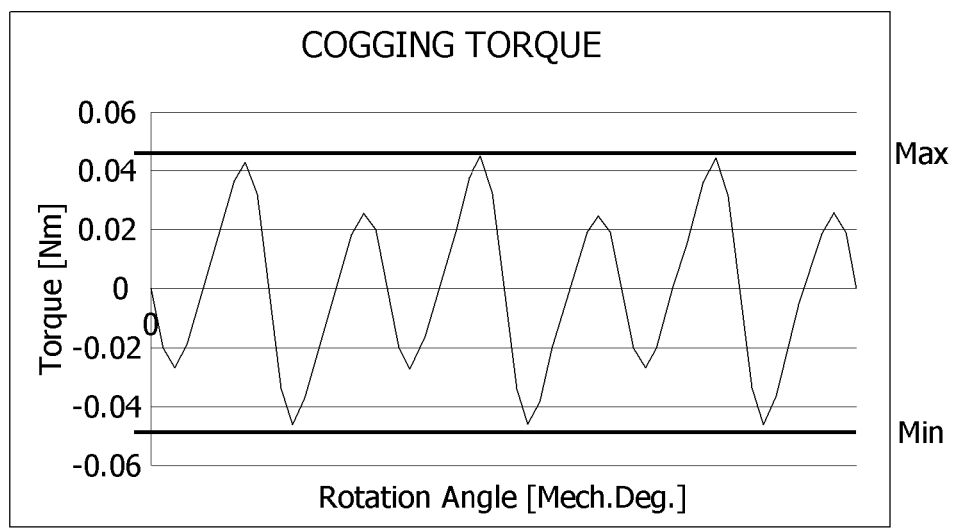
[FIG. 10]
|  | COGGING TORQUE [mNm] | COGGING TORQUE CHANGE RATE | TORQUE [Nm] | TORQUE CHANGE RATE |
|---|---|---|---|---|
| COMPARATIVE MOTOR(2) | 88.00 | - | 4.01 | - |
| R1=11.4mm | 62.30 | 29% ↓ | 3.99 | 0.39% ↓ |
| R1=10.9mm | 73.90 | 16% ↓ | 3.98 | 1.64% ↓ |
| R1=10.4mm | 87.60 | 0.45% ↓ | 3.97 | 0.89% ↓ |

[FIG. 11]
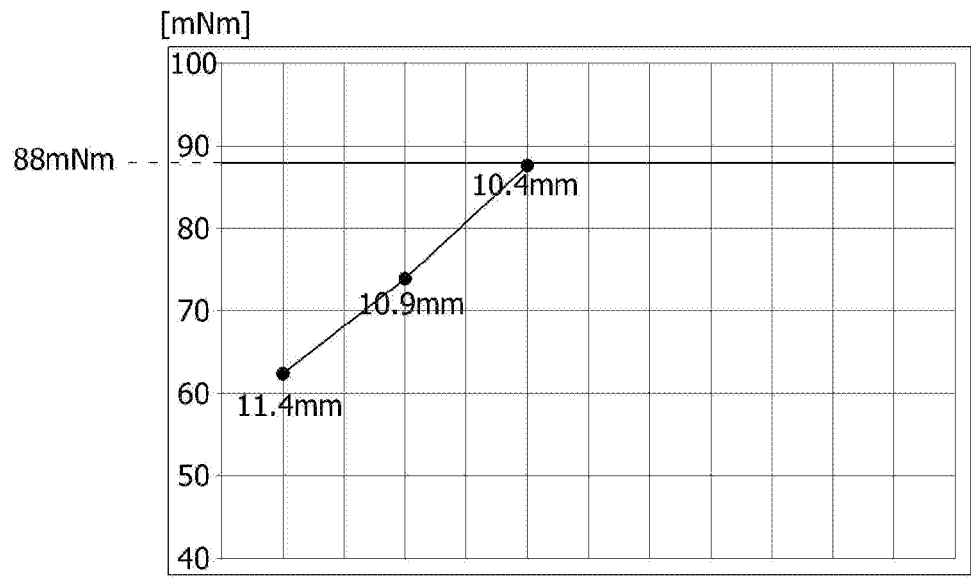
[FIG. 12]
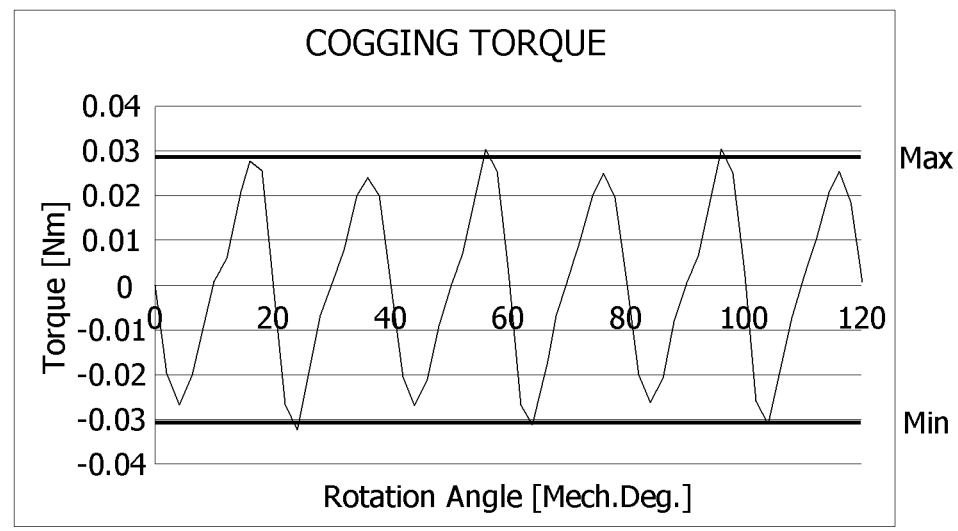

[FIG. 13]
|  | COGGING TORQUE [mNm] | COGGING TORQUE CHANGE RATE | TORQUE [Nm] | TORQUE CHANGE RATE |
|---|---|---|---|---|
| COMPARATIVE MOTOR(2) | 88.00 | - | 4.01 | - |
| R1=11.4mm | 52.00 | 41% ↓ | 3.99 | 0.39% ↓ |
| R1=10.9mm | 48.70 | 45% ↓ | 3.98 | 0.64% ↓ |
| R1=10.4mm | 62.10 | 29% ↓ | 3.97 | 0.89% ↓ |
| R1=9.9mm | 76.40 | 13% ↓ | 3.97 | 0.89% ↓ |
[FIG. 14]
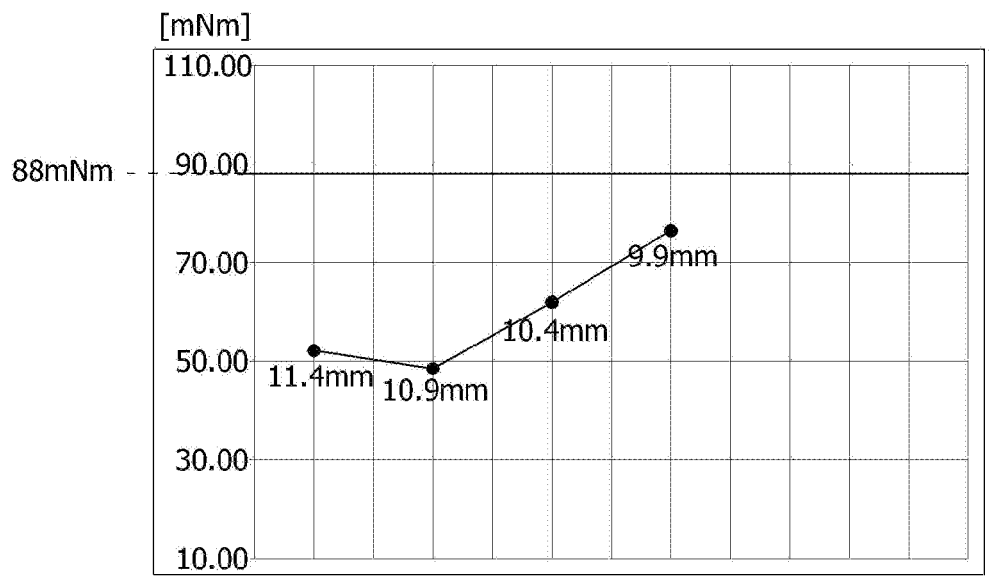

[FIG. 15]
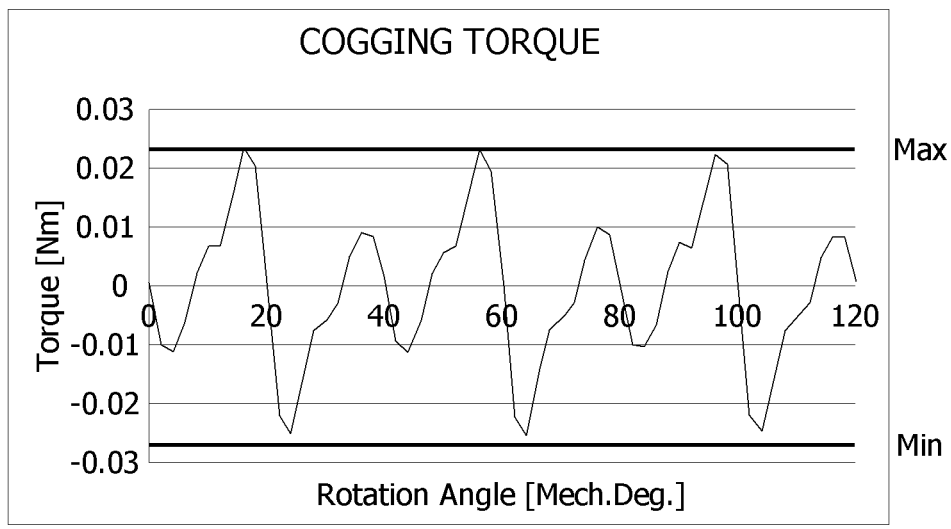
[FIG. 16]
|  | COGGING TORQUE [mNm] | COGGING TORQUE CHANGE RATE | TORQUE [Nm] | TORQUE CHANGE RATE |
|---|---|---|---|---|
| COMPARATIVE MOTOR(2) | 88.00 | - | 4.01 | - |
| R1=11.4mm | 51.50 | 41% ↓ | 4.00 | 0.14% ↓ |
| R1=10.9mm | 24.65 | 72% ↓ | 3.99 | 0.39% ↓ |
| R1=10.4mm | 33.20 | 62% ↓ | 3.99 | 0.39% ↓ |
| R1=9.9mm | 62.16 | 29% ↓ | 3.98 | 0.64% ↓ |

[FIG. 17]
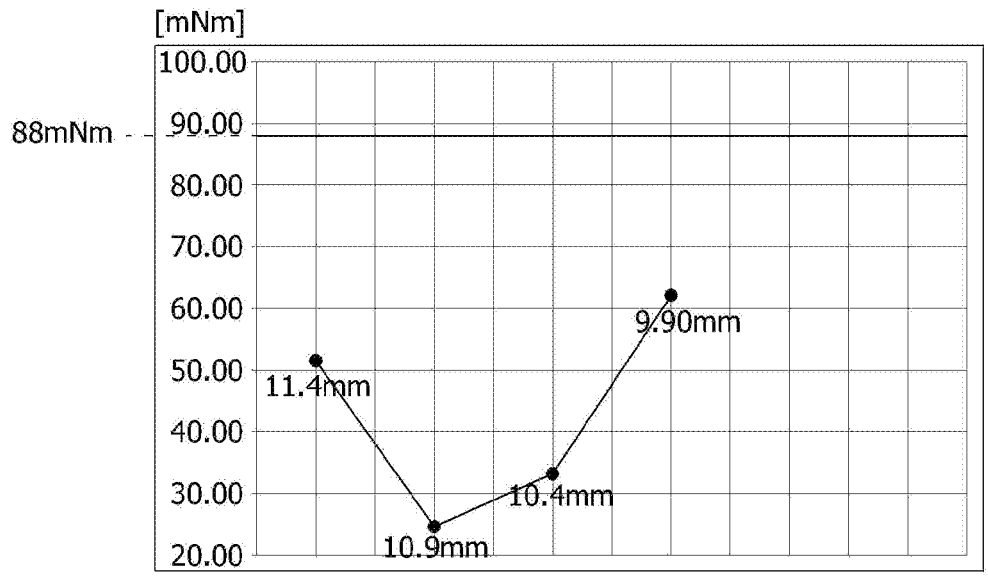
[FIG. 18]
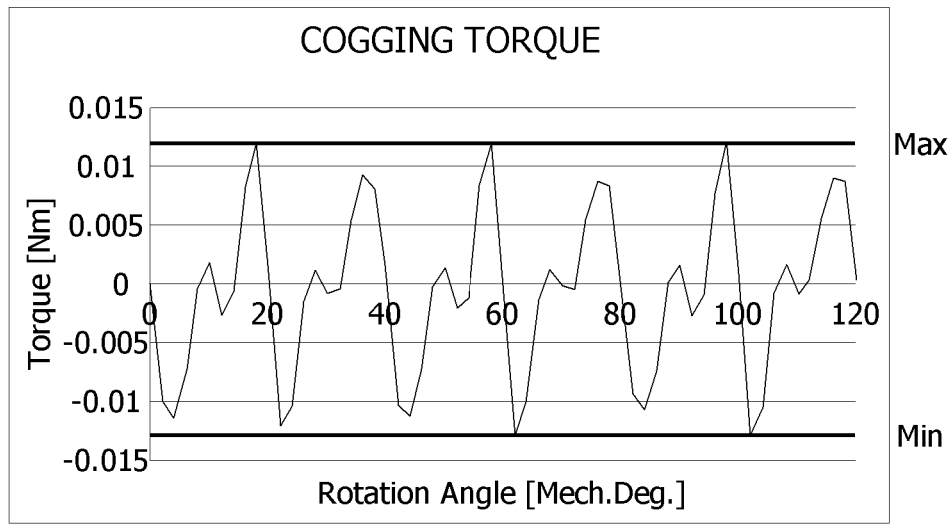

[FIG. 19]
|  | COGGING TORQUE [mNm] | COGGING TORQUE CHANGE RATE | TORQUE [Nm] | TORQUE CHANGE RATE |
|---|---|---|---|---|
| COMPARATIVE MOTOR(2) | 88.00 | - | 4.01 | - |
| R1=11.4mm | 58.60 | 33% ↓ | 4.00 | 0.14% ↓ |
| R1=10.9mm | 41.40 | 53% ↓ | 3.99 | 0.39% ↓ |
| R1=10.4mm | 25.00 | 71.5% ↓ | 3.99 | 0.39% ↓ |
| R1=9.9mm | 54.10 | 39% ↓ | 3.98 | 0.64% ↓ |
[FIG. 20]
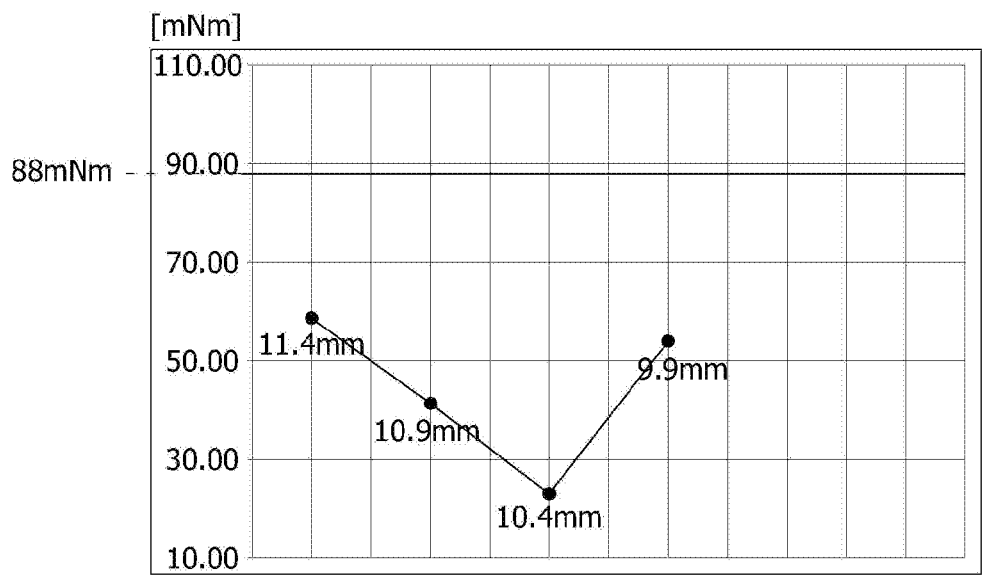

[FIG. 21]
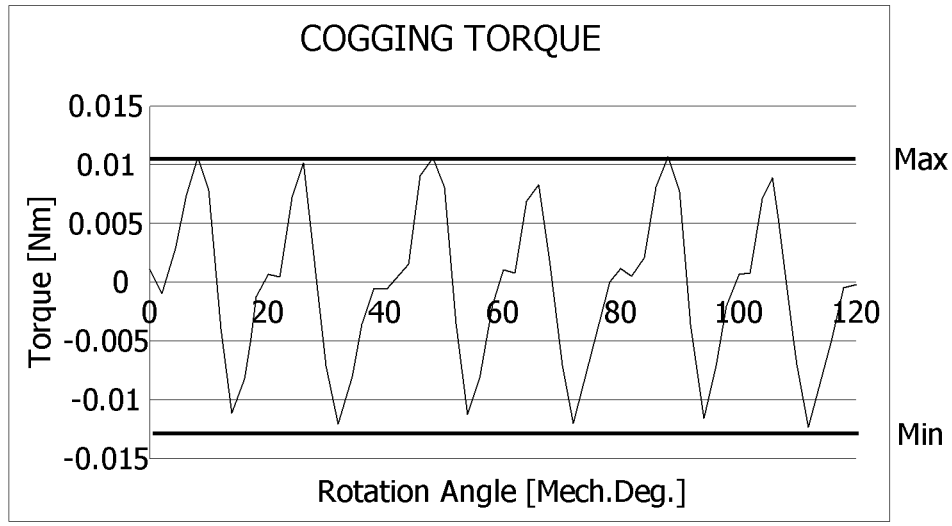
[FIG. 22]
|  | COGGING TORQUE [mNm] | COGGING TORQUE CHANGE RATE | TORQUE [Nm] | TORQUE CHANGE RATE |
|---|---|---|---|---|
| COMPARATIVE MOTOR(2) | 88.00 | - | 4.01 | - |
| W2=12.97mm(13% ↓) | 134.80 | 53% ↑ | 3.91 | 2.0% ↓ |
| W2=13.62mm(9% ↓) | 41.40 | 53% ↓ | 3.99 | 0.39% ↓ |
| W2=13.97mm(7% ↓) | 24.65 | 72% ↓ | 3.99 | 0.39% ↓ |
| W2=14.22mm(5% ↓) | 48.70 | 45% ↓ | 3.98 | 0.64% ↓ |
| W2=14.47mm(3% ↓) | 73.90 | 16% ↓ | 3.98 | 0.64% ↓ |
| W2=14.97mm | 110.40 | 25% ↑ | 3.97 | 1% ↓ |

[FIG. 23]
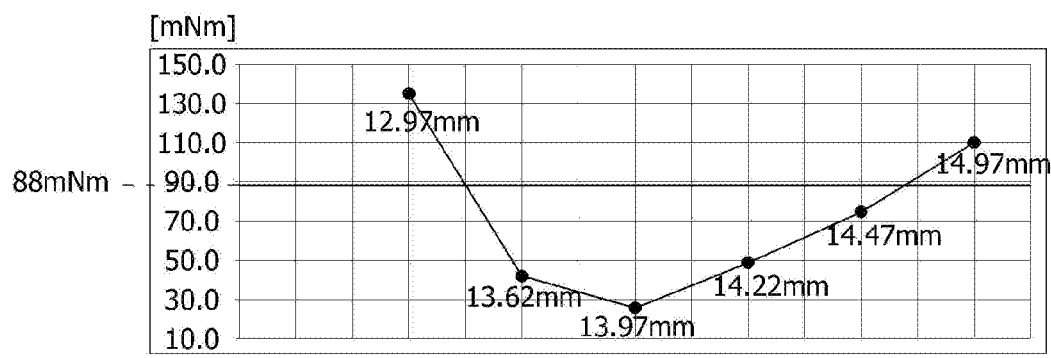

US 11,888,355 B2

ROTOR AND MOTOR INCLUDING SAME

CROSS-REFERENCE TO RELATED PATENT APPLICATIONS

This application is a U.S. National Stage Application under 35 U.S.C. § 371 of PCT Application No. PCT/KR2019/000002, filed Jan. 9, 2019, which claims priority to Korean Patent Application No. 10-2018-0011764, filed Jan. 31, 2018, whose entire disclosures are hereby incorporated by reference.

TECHNICAL FIELD

The present invention relates to a rotor and a motor including the same.

BACKGROUND ART

Motors are apparatuses configured to convert electrical energy into mechanical energy to obtain rotational forces and are widely used for vehicles, home appliances, industrial machines, and the like.

Particularly, in an electronic power steering (EPS) system using the motor, an electronic control unit drives the motor according to driving conditions to secure turning stability and provide a quick restoring force so that a driver can stably drive.

FIG. 1 is a view illustrating a motor according to a comparative example.

Referring to FIG. 1, a motor 2 may include a housing 10, a shaft 20, a stator 30 disposed in the housing 10, a rotor 40 inside the stator 30, and the like. In this case, the stator 30 of the motor 2 generates an electrical interaction with the rotor 40 to induce rotation of the rotor 40.

The rotor 40 may include a rotor core 41 and magnets 42 disposed on an outer circumferential surface of the rotor core 41.

As illustrated in FIG. 1, since the magnets 42 are formed to have the same size and shape, the motor 2 may secure stable output power.

However, since the performance and quality of the motor can be changed according to the shape of the magnet, a motor, of which the performance can be maintained while reducing a cogging torque using the magnet, is required.

TECHNICAL PROBLEM

The present invention is directed to providing a motor of which a cogging torque is decreased using two kinds of magnets having different shapes so that quality thereof is improved.

Objectives that should be achieved according to embodiments are not limited to the above described objectives, and other objectives which are not described above will be clearly understood by those skilled in the art from the following specification.

TECHNICAL SOLUTION

One aspect of the present invention provides a rotor including a rotor core, and a plurality of first magnets and second magnets disposed along an outer circumferential surface of the rotor core, wherein the second magnets are disposed between the first magnets, and a curvature of an outer circumferential surface of the first magnet is greater than a curvature of an outer circumferential surface of the second magnet.

With respect to a thickness which is a distance from an inner circumferential surface of the first magnet to the outer circumferential surface, a thickness of a central portion and a thickness of an end portion may be different, and a minimum thickness of the first magnet may be less than a minimum thickness of the second magnet.

A length (l1) of the inner circumferential surface of the first magnet may be equal to a length (l2) of an inner circumferential surface of the second magnet.

A center (C1) of the outer circumferential surface of the first magnet may be disposed to be spaced apart from a center (C) of the rotor core by a first separation distance (D1), a center (C2) of the outer circumferential surface of the second magnet may be disposed to be spaced apart from the center (C) of the rotor core by a second separation distance (D2), and the first separation distance (D1) may be greater than the second separation distance (D2).

Another aspect of the present invention provides a rotor including a rotor core, and a plurality of first magnets and second magnets disposed along an outer circumferential surface of the rotor core, wherein the first magnet includes a first inner circumferential surface in contact with the rotor core and a first outer circumferential surface disposed opposite to the first inner circumferential surface, the second magnet includes a second inner circumferential surface in contact with the rotor core and a second outer circumferential surface opposite the second inner circumferential surface, in a thickness which is a distance from the inner circumferential surface of the first magnet to the outer circumferential surface, a thickness of a central portion and a thickness of an end portion are different, and a minimum thickness of the first magnet is less than a minimum thickness of the second magnet.

Still another aspect of the present invention provides a rotor including a rotor core, and a plurality of first magnets and second magnets disposed along an outer circumferential surface of the rotor core, wherein the first magnet includes a first inner circumferential surface in contact with the rotor core and a first outer circumferential surface disposed opposite to the first inner circumferential surface, the second magnet includes a second inner circumferential surface in contact with the rotor core and a second outer circumferential surface disposed opposite to the second inner circumferential surface, a length (l1) of the inner circumferential surface of the first magnet is equal to a length (l2) of the inner circumferential surface of the second magnet, and a position of a center between a center (C) of the rotor core and the outer circumferential surface of the first magnet and a position of a center between the center (C) of the rotor core and the outer circumferential surface of the second magnet are different in a radial direction.

A maximum thickness of the first magnet may be equal to a maximum thickness of the second magnet.

An acute angle formed between a side surface of the first magnet and a first tangent line (L1) on the outer circumferential surface of the rotor core may be a first angle (θ1), an acute angle formed between a side surface of the second magnet and a second tangent line (L2) on the outer circumferential surface of the rotor core may be a second angle (θ2), and the first angle (θ1) may be smaller than the second angle (θ2).

A distance (R1) from a center of the first magnet to the outer circumferential surface of the first magnet may be decreased as a width of the second magnet is decreased.

The width of the second magnet may be decreased within a range of 5% to 9% of a width of the first magnet.

The width (W1) of the first magnet may be a distance from one side to the other side of the outer circumferential surface of the first magnet, and the width (W2) of the second magnet may be a distance from one side to the other side of the outer circumferential surface of the second magnet.

A distance (R1) from the center of the first magnet to the outer circumferential surface of the first magnet may be decreased within a range of 4% to 17% of a distance (R2) from a center of the second magnet to the outer circumferential surface of the second magnet.

A maximum distance from a center (C) of the rotor core to the outer circumferential surface of the first magnet may be equal to a maximum distance from the center (C) of the rotor core to an outer circumferential surface of the second magnet.

Yet another aspect of the present invention provides a motor including a housing, a stator disposed inside the housing, a rotor disposed inside the stator, a shaft coupled to the rotor, and a cover disposed on the housing, wherein the rotor includes a rotor core, and a plurality of first magnets and second magnets disposed along an outer circumferential surface of the rotor core, the second magnets are disposed between the first magnets, a curvature of an outer circumferential surface of the first magnet is greater than a curvature of an outer circumferential surface of the second magnet.

The first magnets and second magnets may be respectively provided as three first magnets and three second magnets, and the stator may be provided with nine teeth.

ADVANTAGEOUS EFFECTS

According embodiments, a motor having the above-described structure decreases a cogging torque using a first magnet and a second magnet having different shapes so that quality of the motor can be improved.

Useful advantages and effects of the embodiments are not limited to the above-described contents and will be more easily understood from descriptions of the specific embodiments.

DESCRIPTION OF DRAWINGS

FIG. 1 is a view illustrating a motor according to a comparative example.

FIG. 2 is a view illustrating a motor according to an embodiment.

FIG. 3 is a cross-sectional view taken along line A-A of FIG. 2.

FIG. 4 is a cross-sectional view illustrating a rotor of the motor according to the embodiment.

FIG. 5 is an enlarged view illustrating region A of FIG. 4.

FIG. 6 is a graph showing a cogging torque of the motor according to the comparative example.

FIG. 7 is a table showing a cogging torque and a change in torque according to a change in radius of a first outer circumferential surface of a first magnet when a width of a second magnet is decreased by 1% in the motor according to the embodiment.

FIG. 8 is a graph showing a change in cogging torque according to the change in radius of the first outer circumferential surface of the first magnet when the width of the second magnet is decreased by 1% in the motor according to the embodiment.

FIG. 9 is a graph showing the cogging torque when the width of the second magnet is decreased by 1% and the radius of the first outer circumferential surface of the first magnet is decreased by 4% in the motor according to the embodiment.

FIG. 10 is a table showing the cogging torque and the change in torque according to the change in radius of the first outer circumferential surface of the first magnet when the width of the second magnet is decreased by 3% in the motor according to the embodiment.

FIG. 11 is a graph showing the change in cogging torque according to the change in radius of the first outer circumferential surface of the first magnet when the width of the second magnet is decreased by 3% in the motor according to the embodiment.

FIG. 12 is a graph showing the cogging torque when the width of the second magnet is decreased by 3% and the radius of the first outer circumferential surface of the first magnet is decreased by 4% in the motor according to the embodiment.

FIG. 13 is a table showing the cogging torque and the change in torque according to the change in radius of the first outer circumferential surface of the first magnet when the width of the second magnet is decreased by 5% in the motor according to the embodiment.

FIG. 14 is a graph showing the change in cogging torque according to the change in radius of the first outer circumferential surface of the first magnet when the width of the second magnet is decreased by 5% in the motor according to the embodiment.

FIG. 15 is a graph showing the cogging torque when the width of the second magnet is decreased by 5% and the radius of the first outer circumferential surface of the first magnet is decreased by about 8% in the motor according to the embodiment.

FIG. 16 is a table showing the cogging torque and the change in torque according to the change in radius of the first outer circumferential surface of the first magnet when the width of the second magnet is decreased by 7% in the motor according to the embodiment.

FIG. 17 is a graph showing the change in cogging torque according to the change in radius of the first outer circumferential surface of the first magnet when the width of the second magnet is decreased by 7% in the motor according to the embodiment.

FIG. 18 is a graph showing the cogging torque when the width of the second magnet is decreased by 7% and the radius of the first outer circumferential surface of the first magnet is decreased by about 8% in the motor according to the embodiment.

FIG. 19 is a table showing the cogging torque and the change in torque according to the change in radius of the first outer circumferential surface of the first magnet when the width of the second magnet is decreased by 9% in the motor according to the embodiment.

FIG. 20 is a graph showing the change in cogging torque according to the change in radius of the first outer circumferential surface of the first magnet when the width of the second magnet is decreased by 9% in the motor according to the embodiment.

FIG. 21 is a graph showing the cogging torque when the width of the second magnet is decreased by 9% and the radius of the first outer circumferential surface of the first magnet is decreased by about 13% in the motor according to the embodiment.

FIG. 22 is a table showing the cogging torque and the change in torque according to a change in width of the second magnet when the radius of the first outer circumferential surface of the first magnet is decreased by about 8% in the motor according to the embodiment.

FIG. 23 is a graph showing the change in cogging torque according to the change in width of the second magnet when the radius of the first outer circumferential surface of the first magnet is decreased by about 8% in the motor according to the embodiment.

MODES OF THE INVENTION

Hereinafter, exemplary embodiments of the present invention will be described with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by the context, all terms (including technical and scientific terms) used herein can be interpreted as having customary meanings to those skilled in the art, and meanings of generally used terms, such as those defined in commonly used dictionaries, will be interpreted in consideration of contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In descriptions of components of the present invention, terms such as "first," "second," "A," "B," "(a)," and "(b)" can be used.

The terms are only to distinguish one element from another element, and an essence, order, and the like of the element are not limited by the terms.

It should be understood that, when an element is referred to as being "connected or coupled" to another element, such a description may include both a case in which the element is directly connected or coupled to another element, and a case in which the element is connected or coupled to another element by still another element disposed therebetween.

In a case in which any one element is described as being formed or disposed "on or under" another element, such a description includes both cases in which the two elements are formed or disposed to be in direct contact with each other and one or more other elements are interposed between the two elements. In addition, when one element is described as being formed "on or under" another element, such a description may include a case in which the one element is formed at an upper side or a lower side with respect to another element.

Hereinafter, example embodiments of the invention will be described below in detail with reference to the accompanying drawings. Components that are the same or correspond to each other will be denoted by the same reference numerals regardless of the figure numbers, and redundant descriptions will be omitted.

FIG. 2 is a view illustrating a motor according to an embodiment, and FIG. 3 is a cross-sectional view taken along line A-A of FIG. 2. In FIG. 2, a y-direction refers to an axial direction and an x-direction refers to a radial direction. In addition, the axial direction and the radial direction are perpendicular to each other.

Referring to FIGS. 2 and 3, a motor 1 according to the embodiment may include a housing 100, a cover 200, a stator 300 disposed inside the housing 100, a rotor 400 disposed inside the stator, a shaft 500 coupled to the rotor 400, and a sensor part 600. In this case, "inside" refers to a direction toward a center C in the radial direction and "outside" refers to a direction opposite to "inside."

The housing 100 and the cover 200 may form an exterior of the motor 1. In this case, the housing 100 may be formed to have a cylindrical shape in which an opening is formed in an upper portion.

The cover 200 may be disposed to cover the open upper portion of the housing 100.

Accordingly, the housing 100 and the cover 200 may be coupled to form an accommodation space therein. In addition, as illustrated in FIG. 2, the stator 300, the rotor 400, the shaft 500, the sensor part 600, and the like may be disposed in the accommodation space.

The housing 100 may be formed to have a cylindrical shape. A pocket portion accommodating a bearing B supporting a lower portion of the shaft 500 may be provided in a lower portion of the housing 100.

In addition, a pocket portion accommodating a bearing B supporting an upper portion of the shaft 500 may also be formed on the cover 200 disposed on the housing 100.

The stator 300 may be supported by an inner circumferential surface of the housing 100. In addition, the stator 300 is disposed outside the rotor 400. That is, the rotor 400 may be disposed inside the stator 300.

Referring to FIGS. 2 and 3, the stator 300 may include a stator core 310, coils 320 wound around the stator core 310, and an insulator 330 disposed between the stator core 310 and the coils 320.

The coils 320 generating a rotational magnetic field may be wound around the stator core 310. In this case, the stator core 310 may be provided as one core or a plurality of divided cores which are coupled.

In addition, the stator core 310 may be provided as a plurality of thin steel plates which are stacked, but is not necessarily limited thereto. For example, the stator core 310 may be formed as one single product.

The stator core 310 may include a yoke 311 having a cylindrical shape and a plurality of teeth 312.

The teeth 312 may be disposed to protrude from yoke 311 in the radial direction (x-direction) with respect to the center C. In addition, the plurality of the teeth 312 may be disposed to be spaced apart from each other on an inner circumferential surface of the yoke 311 in a circumferential direction. Accordingly, slots which are spaces through which the coils 320 are wound between the teeth 312 may be formed. In this case, the number of the teeth 312 is nine but is not necessarily limited thereto.

Meanwhile, the teeth 312 may be disposed to face magnets 420 and 430 of the rotor 400. In this case, inner side surfaces of the teeth 312 are disposed to be spaced apart from outer circumferential surfaces of the magnets 420 and 430 by predetermined distances in the radial direction.

In addition, the coils 320 are wound around the teeth 312.

The insulator 330 insulates the stator core 310 from the coils 320. Accordingly, the insulator 330 may be disposed between the stator core 310 and the coils 320.

Accordingly, the coils 320 may be wound around the teeth 312 of the stator core 310 on which the insulator 330 is disposed.

The rotor 400 is disposed inside the stator 300. In addition, the shaft 500 may be coupled to a central portion of the rotor 400.

FIG. 4 is a cross-sectional view illustrating the rotor of the motor according to the embodiment.

Referring to FIGS. 2 to 4, the rotor 400 may include a rotor core 410, and first magnets 420 and second magnets 430 disposed on an outer circumferential surface 411 of the rotor core 410.

As illustrated in FIG. 4, the first magnets 420 and the second magnets 430 may be alternately disposed along the outer circumferential surface of the rotor core 410.

In addition, the number of the first magnets 420 may be equal to the number of the second magnets 430. For example, each of the numbers of the first magnets 420 and the second magnets 430 may be three but is not necessarily limited thereto.

The rotor core 410 may be provided as a plurality of thin plates which are stacked. However, the rotor core 410 may also be manufactured as a single core formed as one cylinder.

The rotor core 410 may be formed to have a cylindrical shape having a predetermined radius R when viewed from above.

A hole to which the shaft 500 is coupled may be formed at a center of the rotor core 410. In addition, protrusions which guide the arrangement of the first magnets 420 and the second magnets 430 may protrude from the outer circumferential surface of the rotor core 410.

The first magnets 420 and the second magnets 430 may be attached to the outer circumferential surface of the rotor core 410. In this case, the plurality of magnets 420 and 430 may be disposed along a circumference of the rotor core 410 at predetermined intervals.

In addition, the first magnets 420 and the second magnets 430 may be disposed to be spaced apart from the teeth 312 of the stator 300 in the radial direction.

Referring to FIG. 4, the first magnets 420 may include outer circumferential surfaces 421, inner circumferential surfaces 422, and side surfaces 423. In this case, the outer circumferential surface 421 and the inner circumferential surface 422 of the first magnet 420 are disposed to be spaced apart from each other by a predetermined distance in the radial direction. In addition, in the first magnet 420, the outer circumferential surface 421 is disposed opposite to the inner circumferential surface 422.

The second magnets 430 may include outer circumferential surfaces 431, inner circumferential surfaces 432, and side surfaces 433. In this case, the outer circumferential surface 431 and the inner circumferential surface 432 of the second magnet 430 may be disposed to be spaced apart from each other by a predetermined distance in the radial direction. In addition, in the second magnet 430, the outer circumferential surface 431 is disposed opposite to the inner circumferential surface 432.

The outer circumferential surface 421, the inner circumferential surface 422, and the side surface 423 of the first magnet 420 may be referred to as a first outer circumferential surface, a first inner circumferential surface, and a first side surface, respectively. In addition, the outer circumferential surface 431, the inner circumferential surface 432, and the side surface 433 of the second magnet 430 may be referred to as a second outer circumferential surface, a second inner circumferential surface, and a second side surface, respectively.

Hereinafter, in order to clearly distinguish the portions of the first magnet 420 and the second magnet 430, the above-described portions of the first magnet 420 are referred to as the first outer circumferential surface 421, the first inner circumferential surface 422, and the first side surface 423, and the above-described portions of the second magnet 430 are referred to as the second outer circumferential surface 431, the second inner circumferential surface 432, and the second side surface 433.

The first outer circumferential surface 421 is disposed at an outer side of the first magnet 420. In addition, the second outer circumferential surface 431 is disposed at an outer side of the second magnet 430.

The first inner circumferential surface 422 is in contact with the outer circumferential surface 411 of the rotor core 410. In addition, the second inner circumferential surface 432 is in contact with the outer circumferential surface 411 of the rotor core 410. Accordingly, the first inner circumferential surface 422 and the second inner circumferential surface 432 may have the same curvature 1/R. In this case, a center of the first inner circumferential surface 422 and a center of the second inner circumferential surface 432 are the same as a center C of the rotor core 410.

In this case, a length l1 of the first inner circumferential surface 422 of the first magnet 420 is equal to a length l2 of the inner circumferential surface 432 of the second magnet 430. In this case, the lengths l1 and l2 from one sides to the other sides of the inner circumferential surfaces 422 and 432 may be arc lengths.

Meanwhile, since the first outer circumferential surface 421 and the first inner circumferential surface 422 of the first magnet 420 are formed to be spaced apart from each other in the radial direction, the first magnet 420 may be formed to have a predetermined thickness. In this case, the thickness refers to a distance from the first inner circumferential surface 422 of the first magnet 420 to the first outer circumferential surface 421 on a normal line of the first inner circumferential surface 422.

In this case, in the thickness which is the distance from the first inner circumferential surface 422 of the first magnet 420 to the first outer circumferential surface 421, a thickness T1max of a central portion is different from a thickness T1min of an end portion.

As illustrated in FIG. 4, the thickness T1max of the central portion of the first magnet 420 is greater than the thickness T1min of the end portion. In this case, the central portion of the first magnet 420 may refer to a portion at which a virtual line connecting the center of the first inner circumferential surface 422 and a center of the first outer circumferential surface 421 is positioned. In addition, the end portion of the first magnet 420 may refer to a portion at which a virtual line on which the normal line of the first inner circumferential surface 422 meets one end of the first outer circumferential surface 421 is positioned.

Accordingly, the thickness T1max of the central portion of the first magnet 420 may refer to a maximum thickness of the first magnet 420, and the thickness T1min of the end portion of the first magnet 420 may refer to a minimum thickness of the first magnet 420.

Since the second outer circumferential surface 431 and the second inner circumferential surface 432 of the second magnet 430 are formed to be spaced apart from each other in the radial direction, the second magnet 430 may be formed to have a predetermined thickness. In this case, the thickness may refer to a distance from the second inner circumferential surface 432 of the second magnet 430 to the second outer circumferential surface 431 on a normal line of second inner circumferential surface 432.

In this case, in the thickness which is the distance from the second inner circumferential surface 432 of the second magnet 430 to the second outer circumferential surface 431, a thickness T2max of a central portion and a thickness T2min of an end portion are different.

As illustrated in FIG. 4, the thickness T2max of the central portion of the second magnet 430 is greater than the thickness T2min of the end portion. In this case, the central portion of the second magnet 430 may refer to a portion at which a virtual line connecting the center of the second inner circumferential surface 432 and a center of the second outer circumferential surface 431 is positioned. In addition, the end portion of the second magnet 430 may refer to a portion at which a virtual line on which the normal line of the second inner circumferential surface 432 meets one end of the second outer circumferential surface 431 is positioned.

Accordingly, the thickness T2max of the central portion of the second magnet 430 may refer to a maximum thickness of the second magnet 430, and the thickness T2min of the end portion of the second magnet 430 may refer to a minimum thickness of the second magnet 430.

Referring to FIG. 4, the maximum thickness T1max of the first magnet 420 is equal to the maximum thickness T2max of the second magnet 430.

Accordingly, a maximum distance R+T1max from the center C of the rotor core 410 of the motor 1 to the first outer circumferential surface 421 of the first magnet 420 is equal to a maximum distance R+T2max to the second outer circumferential surface 431 of the second magnet 430 therefrom.

Referring to FIG. 4, the minimum thickness T1min of the first magnet 420 is less than the minimum thickness T2min of the second magnet 430.

In addition, the first outer circumferential surface 421 and the second outer circumferential surface 431 may be formed to have curved surfaces to which the central portions protrude outward from edge regions.

As illustrated in FIG. 4, the first outer circumferential surface 421 may be formed to have a predetermined curvature 1/R1. In addition, the second outer circumferential surface 431 may be formed to have a predetermined curvature 1/R2.

The curvature 1/R1 of the first outer circumferential surface 421 is greater than the predetermined curvature 1/R2 of the second outer circumferential surface 431. In this case, a position of a center C1 of the first outer circumferential surface 421 of the first magnet 420 is different from a position of a center C2 of the second outer circumferential surface 431 of the second magnet 430.

In addition, as illustrated in FIG. 4, when any one of the center C1 of the first outer circumferential surface 421 of the first magnet 420 and the center C2 of the second outer circumferential surface 431 of the second magnet 430 is moved in a circumferential direction such that the center C1 and the center C2 are collinear with each other in the radial direction, the center C2 of the second outer circumferential surface 431 is positioned between the center C of the rotor core 410 and the center C1 of the first outer circumferential surface 421.

Accordingly, the center C1 of the first outer circumferential surface 421 of the first magnet 420 is disposed to be spaced apart from the center C of the rotor core 410 by a first separation distance D1. In addition, the center C2 of the second outer circumferential surface 431 of the second magnet 430 is disposed to be spaced apart from the center C of the rotor core 410 by a second separation distance D2. In addition, the first separation distance D1 is greater than the second separation distance D2.

Accordingly, the maximum distance R+T1max from the center C of the rotor core 410 of the motor 1 to the first outer circumferential surface 421 of the first magnet 420 may be the sum of the first separation distance D1 and a distance R1 from the center C1 of the first outer circumferential surface 421 to the first outer circumferential surface 421. In this case, since the first outer circumferential surface 421 of the first magnet 420 may be formed to have the predetermined curvature 1/R1, the distance R1 may be a radius R1 from the center C1 of the first outer circumferential surface 421 to the first outer circumferential surface 421.

In addition, the maximum distance R+T2max from the center C of the rotor core 410 to the second outer circumferential surface 431 of the second magnet 430 of the motor 1 may be the sum of the second separation distance D2 and a distance R2 from the center C2 of the second outer circumferential surface 431 to the second outer circumferential surface 431 of the second magnet 430. In this case, since the second outer circumferential surface 431 of the second magnet 430 may be formed to have the predetermined curvature 1/R2, the distance R2 may be a radius R2 from the center C2 of the second outer circumferential surface 431 to the second outer circumferential surface 431.

The first side surface 423 of the first magnet 420 may be disposed to be inclined at a predetermined angle when viewed from above. In this case, the first side surface 423 may connect one end of the first outer circumferential surface 421 and one end of the first inner circumferential surface 422.

The second side surface 433 of the second magnet 430 may be disposed to be inclined at a predetermined angle when viewed from above. In this case, the second side surface 433 may connect one end of the second outer circumferential surface 431 and one end of the second inner circumferential surface 432.

FIG. 5 is an enlarged view illustrating region A of FIG. 4.

Referring to FIGS. 4 and 5, a predetermined angle may be formed between the first side surface 423 of the first magnet 420 and a first tangent line L1 at one point P1 on the outer circumferential surface 411 of the rotor core 410, and an acute angle formed between the first side surface 423 and the first tangent line L1 may be referred to as a first angle $\theta 1$. In this case, the one point P1 may be referred to as a first point, and the first point may be a point at which an extension line of the first side surface 423 meets the outer circumferential surface 411 of the rotor core 410. When an inner end portion of the first side surface 423 is not rounded, the first point may be a point at which the first side surface 423 meets the outer circumferential surface 411 of the rotor core 410.

In addition, a predetermined angle may be formed between the second side surface 433 of the second magnet 430 and a second tangent line L2 at one point P2 on the outer circumferential surface 411 of the rotor core 410, and an acute angle formed between the second side surface 433 and the second tangent line L2 may be referred to as a second angle $\theta 2$. In this case, the one point P2 may be referred to as a second point, and the second point may be a point at which an extension line of the second side surface 433 meets the outer circumferential surface 411 of the rotor core 410. When an inner end potion of the second side surface 433 is not rounded, the second point may be a point at which the second side surface 433 meets the outer circumferential surface 411 of the rotor core 410.

Accordingly, as illustrated in FIG. 5, the first angle $\theta 1$ formed between the first side surface 423 and the first tangent line L1 is less than the second angle θ2. However, the first angle θ1 is not necessarily limited thereto and may also be formed to be equal to the second angle θ2 in consideration of performance and a cogging torque of the motor 1.

Meanwhile, a width W1 of the first magnet 420 is greater than a width W2 of the second magnet 430. In this case, when viewed from above, the width W1 of the first magnet 420 refers to a linear distance from one side to the other side of the first outer circumferential surface 421 of the first magnet 420. In addition, when viewed from above, the width W2 of the second magnet 430 refers to a linear distance from one side to the other side of the second outer circumferential surface 431 of the second magnet 430.

In addition, as the width W2 of the second magnet 430 is decreased, the radius R1 from the center C1 of the first magnet 420 to the first outer circumferential surface 421 of the first magnet 420 is decreased. In this case, a maximum distance from the center C of the rotor core 410 to the first outer circumferential surface 421 of the first magnet 420 is equal to a maximum distance to the second outer circumferential surface 431 of the second magnet 430 therefrom.

The width W2 of the second magnet 430 may be decreased within a range from 3 to 9% of the width W1 of the first magnet 420. Preferably, the width W2 of the second magnet 430 may be decreased within a range from 5% to 9% of the width W1 of the first magnet 420.

Accordingly, the distance R1 from the center C1 of the first magnet 420 to the first outer circumferential surface 421 of the first magnet 420 may be decreased within a range from 4% to 17% of the distance R2 from the center C2 of the second magnet 430 to the second outer circumferential surface 431 of the second magnet 430. Preferably, the distance R1 from the center C 1 of the first magnet 420 to the first outer circumferential surface 421 of the first magnet 420 may be decreased within a range from 4% to 13% of the distance R2 from the center C2 of the second magnet 430 to the second outer circumferential surface 431 of the second magnet 430 in consideration of the decreased value of the width W2 of the second magnet 430.

FIG. 6 is a graph showing a cogging torque of a motor according to a comparative example, FIG. 7 is a table showing a cogging torque and a change in torque according to a change in radius of the first outer circumferential surface of the first magnet when the width of the second magnet is decreased by 1% in the motor according to the embodiment, FIG. 8 is a graph showing a change in cogging torque according to the change in radius of the first outer circumferential surface of the first magnet when the width of the second magnet is decreased by 1% in the motor according to the embodiment, and FIG. 9 is a graph showing the cogging torque when the width of the second magnet is decreased by 1% and the radius of the first outer circumferential surface of the first magnet is decreased by 4% in the motor according to the embodiment. In FIG. 8, 88 mNm is a cogging torque of a motor 2 which is the comparative example.

When the motor 2 according to the comparative example of FIG. 6 uses one kind of magnets 42, a width of the magnet 42 of the motor 2 may be equal to the width of the second magnet 430 of the motor 1 before the width of the second magnet 430 is decreased. In addition, a radius and a curvature of an outer circumferential surface of the magnet 42 may be equal to the radius and the curvature of the second magnet 430 of the motor 1.

Referring to FIGS. 6 to 8, a torque of the motor 2 is 4.01 Nm. In addition, the cogging torque of the motor 2 is 88 mNm. In this case, the width of the magnet 42 of the motor 2 may be 14.97 mm, and the radius of the outer circumferential surface of the magnet 42 may be 11.9 mm. In addition, the radius of the outer circumferential surface 431 of the second magnet 430 may be 11.9 mm. In this case, the width W2 of the second magnet 430 may be decreased from 14.97 mm. In addition, the width W1 of the first magnet 420 may be 14.97 mm.

In the table illustrated in FIG. 7, when the width W2 of the second magnet 430 of the motor 1 is decreased by 1% of the width of the magnet 42 of the motor 2, and the radius R1 of the first outer circumferential surface 421 of the first magnet 420 is decreased in increments of 0.5 mm from 11.9 mm, the cogging torque and the change in torque are shown.

In FIG. 7, it may be seen that a torque of the motor 1 is decreased when the radius R1 of the first outer circumferential surface 421 of the first magnet 420 is decreased. In addition, it may be seen that the cogging torque of the motor 1 is increased.

Particularly, when FIGS. 9 and 6 are compared, it may be seen that improvement of the cogging torque of the motor 1 according to the embodiment is insignificant.

Accordingly, referring to FIGS. 6 to 9, it may be seen that, when the width W1 of the second magnet 430 of the motor 1 is decreased by 1%, the cogging torque is not improved even when the radius R1 of the first outer circumferential surface 421 of the first magnet 420 is changed.

FIG. 10 is a table showing the cogging torque and the change in torque according to the change in radius of the first outer circumferential surface of the first magnet when the width of the second magnet is decreased by 3% in the motor according to the embodiment, FIG. 11 is a graph showing the change in cogging torque according to the change in radius of the first outer circumferential surface of the first magnet when the width of the second magnet is decreased by 3% in the motor according to the embodiment, and FIG. 12 is a graph showing the cogging torque when the width of the second magnet is decreased by 3% and the radius of the first outer circumferential surface of the first magnet is decreased by 4% in the motor according to the embodiment.

In the table illustrated in FIG. 10, when the width W2 of the second magnet 430 of the motor 1 is decreased by 3% of the width of the magnet 42 of the motor 2, and the radius R1 of the first outer circumferential surface 421 of the first magnet 420 is decreased in increments of 0.5 mm from 11.9 mm, the cogging torque and the change in torque are shown. In this case, the radius R1 of the first outer circumferential surface 421 of the first magnet 420 may be decreased by 4% to 13% of the radius R2.

In FIG. 10, it may be seen that the torque of the motor 1 is decreased as the radius R1 of the first outer circumferential surface 421 of the first magnet 420 is decreased. In addition, it may be seen that the cogging torque of the motor 1 is decreased. In this case, a cogging torque change rate of the motor 1 is decreased as the radius R1 of the first outer circumferential surface 421 of the first magnet 420 is decreased in increments of 0.5 mm from 11.9 mm.

As illustrated in FIG. 11, the cogging torque of the motor 1 is less than that of the motor 2 according to the comparative example. However, the cogging torque of the motor 1 is increased as the radius R1 of the first outer circumferential surface 421 of the first magnet 420 is decreased.

Particularly, when FIGS. 12 and 6 are compared, it may be seen that the cogging torque of the motor 1 according to the embodiment is improved. In this case, the radius R1 of the first outer circumferential surface 421 of the first magnet 420 may be 11.4.

Accordingly, referring to FIGS. 6 and 10 to 12, it may be seen that, when the width W2 of the second magnet 430 of the motor 1 is decreased by 3%, in a case in which the radius of the first outer circumferential surface 421 of the first magnet 420 is changed, the cogging torque is improved. However, the cogging torque change rate is decreased as the radius R1 of the first outer circumferential surface 421 of the first magnet 420 is decreased.

FIG. 13 is a table showing the cogging torque and the change in torque according to the change in radius of the first outer circumferential surface of the first magnet when the width of the second magnet is decreased by 5% in the motor according to the embodiment, FIG. 14 is a graph showing the change in cogging torque according to the change in radius of the first outer circumferential surface of the first magnet when the width of the second magnet is decreased by 5% in the motor according to the embodiment, and FIG. 15 is a graph showing the cogging torque when the width of the second magnet is decreased by 5% and the radius of the first outer circumferential surface of the first magnet is decreased by about 8% in the motor according to the embodiment.

In FIG. 13, it may be seen that the torque of the motor 1 is slightly decreased as the radius R1 of the first outer circumferential surface 421 of the first magnet 420 is decreased. In addition, it may be seen that the cogging torque of the motor 1 is decreased. In this case, the cogging torque of the motor 1 is decreased as the radius R1 of the first outer circumferential surface 421 of the first magnet 420 is decreased in increments of 0.5 mm from 11.9 mm, and is increased from when the radius R1 of the first outer circumferential surface 421 becomes 10.9 mm. In this case, the radius R1 of the first outer circumferential surface 421 of the first magnet 420 may be decreased by 4% to 17% of the radius R2.

As illustrated in FIG. 14, the cogging torque of the motor 1 is less than that of the motor 2 according to the comparative example. However, the cogging torque of the motor 1 is decreased as the radius R1 of the first outer circumferential surface 421 of the first magnet 420 is decreased, and increased from when the radius R1 of the first outer circumferential surface 421 is 10.9 mm.

Accordingly, it may be seen that, in a case in which the width W2 of the second magnet 430 of the motor 1 is decreased by 5%, an optimum value is obtained when the radius R1 of the first outer circumferential surface 421 is 10.9 mm.

Particularly, when FIGS. 15 and 6 are compared, it may be seen that the cogging torque of the motor 1 according to the embodiment is improved. In this case, the radius R1 of the first outer circumferential surface 421 of the first magnet 420 may be 10.9 mm.

Accordingly, referring to FIGS. 6 and 13 to 15, it may be seen that, when the width W2 of the second magnet 430 of the motor 1 is decreased by 5%, in a case in which the radius of the first outer circumferential surface 421 of the first magnet 420 is changed, the cogging torque is improved. Particularly, it may be seen that, when the radius R1 of the first outer circumferential surface 421 of the first magnet 420 is 10.9 mm, the cogging torque change rate is highest and performance is also maintained.

FIG. 16 is a table showing the cogging torque and the change in torque according to the change in radius of the first outer circumferential surface of the first magnet when the width of the second magnet is decreased by 7% in the motor according to the embodiment, FIG. 17 is a graph showing the change in cogging torque according to the change in radius of the first outer circumferential surface of the first magnet when the width of the second magnet is decreased by 7% in the motor according to the embodiment, and FIG. 18 is a graph showing the cogging torque when the width of the second magnet is decreased by 7% and the radius of the first outer circumferential surface of the first magnet is decreased by about 8% in the motor according to the embodiment.

In FIG. 16, it may be seen that the torque of the motor 1 is slightly decreased as the radius R1 of the first outer circumferential surface 421 of the first magnet 420 is decreased. In addition, it may be seen that the cogging torque of the motor 1 is decreased. In this case, the cogging torque of the motor 1 is decreased as the radius R1 of the first outer circumferential surface 421 of the first magnet 420 is decreased in increments of 0.5 mm from 11.9 mm, and increased from when the radius R1 of the first outer circumferential surface 421 becomes 10.9 mm. In this case, the radius R1 of the first outer circumferential surface 421 of the first magnet 420 may be decreased by 4% to 17% of the radius R2.

As illustrated in FIG. 17, the cogging torque of the motor 1 is less than that of the motor 2 according to the comparative example. However, the cogging torque of the motor 1 is decreased as the radius R1 of the first outer circumferential surface 421 of the first magnet 420 is decreased, and increased from when the radius R1 of the first outer circumferential surface 421 is 10.9 mm.

Accordingly, it may be seen that, in a case in which the width W2 of the second magnet 430 of the motor 1 is decreased by 7%, an optimum value is obtained when the radius R1 of the first outer circumferential surface 421 is 10.9 mm.

Particularly, when FIGS. 18 and 6 are compared, it may be seen that the cogging torque of the motor 1 according to the embodiment is improved. In this case, the radius R1 of the first outer circumferential surface 421 of the first magnet 420 may be 10.9 mm.

Accordingly, referring to FIGS. 6 and 16 to 18, it may be seen that, when the width W2 of the second magnet 430 of the motor 1 is decreased by 7%, in a case in which the radius of the first outer circumferential surface 421 of the first magnet 420 is changed, the cogging torque is improved. Particularly, it may be seen that, when the radius R1 of the first outer circumferential surface 421 of the first magnet 420 is 10.9 mm, the cogging torque change rate is highest, and performance is also maintained.

FIG. 19 is a table showing the cogging torque and the change in torque according to the change in radius of the first outer circumferential surface of the first magnet when the width of the second magnet is decreased by 9% in the motor according to the embodiment, FIG. 20 is a graph showing the change in cogging torque according to the change in radius of the first outer circumferential surface of the first magnet when the width of the second magnet is decreased by 9% in the motor according to the embodiment, and FIG. 21 is a graph showing the cogging torque when the width of the second magnet is decreased by 9% and the radius of the first outer circumferential surface of the first magnet is decreased by about 13% in the motor according to the embodiment.

In FIG. 19, it may be seen that the torque of the motor 1 is slightly decreased as the radius R1 of the first outer circumferential surface 421 of the first magnet 420 is decreased. In addition, it may be seen that the cogging torque of the motor 1 is decreased. In this case, the cogging torque of the motor 1 is decreased as the radius R1 of the first outer circumferential surface 421 of the first magnet 420 is decreased in increments of 0.5 mm from 11.9 mm, and increased from when the radius R1 of the first outer circumferential surface 421 becomes 10.4 mm. In this case, the radius R1 of the first outer circumferential surface 421 of the first magnet 420 may be decreased by 4% to 17% of the radius R2.

As illustrated in FIG. 20, the cogging torque of the motor 1 is less than that of the motor 2 according to the comparative example. However, the cogging torque of the motor 1 is decreased as the radius R1 of the first outer circumferential surface 421 of the first magnet 420 is decreased, and increased from when the radius R1 of the first outer circumferential surface 421 is 10.4 mm.

Accordingly, it may be seen that, in a case in which the width W2 of the second magnet 430 of the motor 1 is decreased by 9%, an optimum value is obtained when the radius R1 of the first outer circumferential surface 421 is 10.4 mm.

Particularly, when FIGS. 21 and 6 are compared, it may be seen that the cogging torque of the motor 1 according to the embodiment is improved. In this case, the radius R1 of the first outer circumferential surface 421 of the first magnet 420 may be 10.4 mm.

Accordingly, referring to FIGS. 6 and 19 to 21, it may be seen that, when the width W2 of the second magnet 430 of the motor 1 is decreased by 9%, in a case in which the radius of the first outer circumferential surface 421 of the first magnet 420 is changed, the cogging torque is improved. Particularly, it may be seen that, when the radius R1 of the first outer circumferential surface 421 of the first magnet 420 is 10.4 mm, the cogging torque change rate is highest and performance is also maintained.

FIG. 22 is a table showing the cogging torque and the change in torque according to a change in width of the second magnet when the radius of the first outer circumferential surface of the first magnet is decreased by about 8% in the motor according to the embodiment.

FIG. 23 is a graph showing the change in cogging torque according to the change in width of the second magnet when the radius of the first outer circumferential surface of the first magnet is decreased by about 8% in the motor according to the embodiment.

In FIG. 23, it may be seen that, when the radius R1 of the first outer circumferential surface 421 of the first magnet 420 is 10.9 mm, the torque and the cogging torque of the motor 1 are changed according to the width W2 of the second magnet 430. For example, the cogging torque of the motor 1 is decreased as the width W2 of the second magnet 430 is decreased, and increased from when the width W2 of the second magnet 430 becomes 13.97 mm (is decreased by 7%).

That is, when the cogging torque change rate and the torque change rate of the motor 1 are considered, in a case in which the width W2 of the second magnet 430 is decreased by 5% to 9% of the width W1 of the first magnet 420, an optimal combination is obtained.

As illustrated in FIG. 23, the cogging torque of the motor 1 is less than that of the motor 2 according to the comparative example in some regions. In addition, the cogging torque of the motor 1 is decreased as the width W2 of the second magnet 430 is decreased, and increased from when the width W2 of the second magnet 430 is decreased by 7% of the width W1 of the first magnet 420.

Accordingly, it may be seen that, in a case in which the width W2 of the second magnet 430 of the motor 1 is decreased by 7%, an optimum value is obtained when the radius R1 of the first outer circumferential surface 421 is 10.9 mm (is decreased by 8% of the radius R2 of the second outer circumferential surface 431).

Accordingly, in the motor 1, performance is not different from that of the motor 2 according to the comparative example, but the cogging torque can be decreased to improve quality thereof.

Meanwhile, the rotor 400 may further include a shield (not shown) disposed outside the magnets 420 and 430. In this case, the shield may be referred to as a can or rotor can.

The shield surrounds the magnets 420 and 430 to serve a function of fixing magnets 420 and 430 so that the magnets 420 and 430 are not separated from the rotor core 410. In this case, the shield may be formed to have a cylindrical shape, and an inner circumferential surface of the shield may be in contact with the outer circumferential surfaces 421 and 431 of the magnets 420 and 430.

The shaft 500 may be coupled to the rotor 400. When a current is supplied and an electrical interaction occurs between the rotor 400 and the stator 300, the rotor 400 is rotated, and the shaft 500 is rotated in conjunction with the rotor. In this case, the shaft 500 may be supported by the bearing B.

The shaft 500 may be connected to a steering shaft of a vehicle. Accordingly, the steering shaft may receive power as the shaft 500 rotates.

The sensor part 600 detects a magnetic force of a sensing magnet which is installed to operate in conjunction with rotation of the rotor 400 to check a present position of the rotor 400 so as to detect a position at which the shaft 500 is rotated.

The sensor part 600 may include a sensing magnet assembly 610 and a printed circuit board (PCB) 620.

The sensing magnet assembly 610 is coupled to the shaft 500 to operate in conjunction with the rotor 400 to detect the position of the rotor 400. In this case, the sensing magnet assembly 610 may include a sensing magnet and a sensing plate. The sensing magnet and the sensing plate may be coaxially coupled.

The sensing magnet may include a main magnet disposed close to a hole forming an inner circumferential surface in a circumferential direction and a sub-magnet disposed at an edge. The main magnet may be arranged in the same manner as a drive magnet inserted into the rotor 400 of the motor. The sub-magnet is divided into pieces of which the number is greater than the number of pieces of the main magnet so that the number of poles of the sub-magnet is greater than that of the main magnet. Accordingly, a rotation angle is more precisely divided to check the position so that the motor may be driven more smoothly.

The sensing plate may be formed of a metal material having a disc shape. The sensing magnet may be coupled to an upper surface of the sensing plate. In addition, the sensing plate may be coupled to the shaft 500. In this case, a hole through which the shaft 500 passes is formed in the sensing plate.

A sensor configured to detect a magnetic force of the sensing magnet may be disposed on the PCB 620. In this case, the sensor may be provided as a Hall integrated circuit (IC). In addition, the sensor may detect a change in N-pole and S-pole of the sensing magnet to generate a sensing signal.

While the invention has been shown and described with reference to the exemplary embodiments thereof, it will be understood by those skilled in the art that various changes in form and details may be made therein without departing from the spirit and scope of the invention as defined by the appended claims. In addition, it should be understood that related to modifications and changes fall within the scope of the present invention defined by the appended claims.

REFERENCE NUMERALS

1: MOTOR 100: HOUSING
200: COVER 300: STATOR
310: STATOR CORE 311: YOKE
312: TOOTH 320: COIL
400: ROTOR 410: ROTOR CORE
420: FIRST MAGNET 430: SECOND MAGNET
500: SHAFT 600: SENSOR PART

The invention claimed is:

1. A rotor comprising:
a rotor core; and
a plurality of first magnets and second magnets disposed along an outer circumferential surface of the rotor core,
wherein the second magnets are disposed between the first magnets, and
a curvature of an outer circumferential surface of the first magnet is greater than a curvature of an outer circumferential surface of the second magnet, wherein:
with respect to a thickness which is a distance from an inner circumferential surface of the first magnet to the outer circumferential surface of the first magnet, a thickness of a central portion of the first magnet and a thickness of an end portion of the first magnet are different;
with respect to a thickness which is a distance from an inner circumferential surface of the second magnet to the outer circumferential surface of the second magnet, a thickness of a central portion of the second magnet and a thickness of an end portion of the second magnet are different;
the thickness of both end portions of the first magnet are the same; and
the thickness of the end portion of the first magnet is less than the thickness of the end portion of the second magnet disposed to face to the end portion of the first magnet.

2. The rotor of claim 1, wherein a length (l1) of the inner circumferential surface of the first magnet is equal to a length (l2) of the inner circumferential surface of the second magnet.

3. The rotor of claim 1, wherein:
a center (C1) of the outer circumferential surface of the first magnet is disposed to be spaced apart from a center (C) of the rotor core by a first separation distance (D1);
a center (C2) of the outer circumferential surface of the second magnet is disposed to be spaced apart from the center (C) of the rotor core by a second separation distance (D2); and
the first separation distance (D1) is greater than the second separation distance (D2).

4. The rotor of claim 1, wherein a maximum thickness of the first magnet is equal to a maximum thickness of the second magnet.

5. The rotor of claim 1, wherein:
an acute angle formed between a side surface of the first magnet and a first tangent line (L1) on the outer circumferential surface of the rotor core is a first angle (θ1);
an acute angle formed between a side surface of the second magnet and a second tangent line (L2) on the outer circumferential surface of the rotor core is a second angle (θ2); and
the first angle (θ1) is smaller than the second angle (θ2).

6. The rotor of claim 1, wherein a distance (R1) from a center of the first magnet to the outer circumferential surface of the first magnet is decreased as a width of the second magnet is decreased.

7. The rotor of claim 6, wherein the width of the second magnet is decreased within a range of 5% to 9% of a width of the first magnet.

8. The rotor of claim 7, wherein:
the width (W1) of the first magnet is a distance from one side to the other side of the outer circumferential surface of the first magnet; and
the width (W2) of the second magnet is a distance from one side to the other side of the outer circumferential surface of the second magnet.

9. The rotor of claim 7, wherein a distance (R1) from the center of the first magnet to the outer circumferential surface of the first magnet is decreased within a range of 4% to 17% of a distance (R2) from a center of the second magnet to the outer circumferential surface of the second magnet.

10. The rotor of claim 1, wherein a maximum distance from a center (C) of the rotor core to the outer circumferential surface of the first magnet is equal to a maximum distance from the center (C) of the rotor core to the outer circumferential surface of the second magnet.

11. A rotor comprising:
a rotor core; and
a plurality of first magnets and second magnets disposed along an outer circumferential surface of the rotor core,
wherein the first magnet includes a first inner circumferential surface in contact with the rotor core and a first outer circumferential surface disposed opposite to the first inner circumferential surface,
the second magnet includes a second inner circumferential surface in contact with the rotor core and a second outer circumferential surface disposed opposite to the second inner circumferential surface,
a length (l1) of the inner circumferential surface of the first magnet is equal to a length (l2) of the inner circumferential surface of the second magnet, and
a position of a center between a center (C) of the rotor core and the outer circumferential surface of the first magnet and a position of a center between the center (C) of the rotor core and the outer circumferential surface of the second magnet are different in a radial direction,
with respect to a thickness which is a distance from the inner circumferential surface of the first magnet to the outer circumferential surface of the first magnet, a thickness of a central portion of the first magnet and a thickness of an end portion of the first magnet are different,
with respect to a thickness which is a distance from the inner circumferential surface of the second magnet to the outer circumferential surface of the second magnet, a thickness of a central portion of the second magnet and a thickness of an end portion of the second magnet are different, and
the thickness of the end portion of the first magnet is less than the thickness of the end portion of the second magnet disposed to face to the end portion of the first magnet.

12. A motor comprising:
a housing;
a stator disposed inside the housing;
a rotor disposed inside the stator;
a shaft coupled to the rotor; and
a cover disposed on the housing, wherein the rotor includes a rotor core, and a plurality of first magnets and second magnets disposed along an outer circumferential surface of the rotor core, the second magnets are disposed between the first magnets, and a curvature of an outer circumferential surface of the first magnet is greater than a curvature of an outer circumferential surface of the second magnet, with respect to a thickness which is a distance from an inner circumferential surface of the first magnet to the outer circumferential surface of the first magnet, a thickness of a central portion of the first magnet and a thickness of an end portion of the first magnet are different, with respect to a thickness which is a distance from an inner circumferential surface of the second magnet to the outer circumferential surface of the second magnet, a thickness of a central portion of the second magnet and a thickness of an end portion of the second magnet are different, and the thickness of the end portion of the first magnet is less than the thickness of the end portion of the second magnet disposed to face to the end portion of the first magnet.

13. The motor of claim 12, wherein:

the first magnets and second magnets are respectively provided as three first magnets and three second magnets; and the stator is provided with nine teeth.

14. The motor of claim 12, wherein:

a minimum thickness of the first magnet is less than a minimum thickness of the second magnet.

15. The motor of claim 14, wherein a length (l1) of the inner circumferential surface of the first magnet is equal to a length (l2) of the inner circumferential surface of the second magnet.

* * * * *